United States Patent [19]

Tur-Kaspa et al.

[11] Patent Number: 4,500,126
[45] Date of Patent: Feb. 19, 1985

[54] OBJECT-GRIPPING DEVICE AND INDUSTRIAL ROBOT INCLUDING SAME

[75] Inventors: Yosef Tur-Kaspa; Ehud Lenz, both of Haifa, Israel

[73] Assignee: Technion Research & Development Foundation Ltd., Haifa, Israel

[21] Appl. No.: 477,867

[22] Filed: Mar. 23, 1983

[51] Int. Cl.³ .............................................. B66C 1/10
[52] U.S. Cl. .................................... 294/86 R; 294/92
[58] Field of Search ................. 294/86 R, 88, 76 CG, 294/67 EA, 1 R, 83 R, 66, 74, 4, 5.5, 99, 19 R, 92, 55, 100, 113; 24/243; 244/161; 414/1

[56] References Cited

U.S. PATENT DOCUMENTS 4,105,241  8/1978  Mee ..................................... 294/86 R
4,173,324 11/1979  Rudmann ........................... 294/86 R

*Primary Examiner*—James B. Marbert
*Attorney, Agent, or Firm*—Benjamin J. Barish

[57] ABSTRACT

An object-gripping device, particularly useful for gripping thin-wall tubes, comprises a first flexible gripping member formed with two loops adapted to partially enclose one side of the object, and a second flexible gripping member formed with a third loop interposed between the two loops of the first member and adapted to partially enclose the opposite side of the object. The gripping device further includes means engaging the opposite ends of the two gripping members to move them away from each other to cause their loops to grip the object, or towards each other to cause them to release the object. A sleeve is provided for each gripping member and is movable along its length to vary the effective gripping size of the loops formed by the two members. Also described is an industrial robot having a vertical arm carrying the object-gripping device such as to enable the arm to grip and release an object from above.

14 Claims, 5 Drawing Figures

OBJECT-GRIPPING DEVICE AND INDUSTRIAL ROBOT INCLUDING SAME

BACKGROUND OF THE INVENTION

The present invention relates to object-gripping devices and to industrial robots including such devices as used in automated assebmly systems. The invention is particularly useful for gripping delicate thin-wall tubes and is described below with respect to such an application although it will be appreciated that the invention could advantageously be used in other applications as well.

One of the more serious problems in the development of robotic or automated assembly systems is the problem of gripping and releasing the objects or parts being assembled, particularly when assembling small parts. A high proportion of the parts assembled in most devices, especially electronic and electromechanical devices, are small parts. The problem is especially aggravated when the objects or parts to be gripped are so delicate in structure, such as thin-wall tubes, so as to be easily deformed or damaged by the gripping device. Many techniques have been proposed for solving this problem, including vacuum, magnetic and electro-magnetic type grippers, but insofar as we are aware, no entirely-satisfactory arrangement has yet been devised applicable for highly-delicate objects, such as ultra-thin-wall tubes in the order of 0.01 mm wall thickness.

An object of the present invention is to provide a gripping device having advantages in the above respects. More particularly, an object of the present invention is to provide a gripping device which may be used for highly-deformable or highly-delicate objects, such as thin-wall tubes, without causing deformation or damage to the parts being gripped. Another object of the invention is to provide a robot equipped with such a gripping device.

BRIEF SUMMARY OF THE INVENTION

According to a broad aspect of the present invention, there is provided an object-gripping device particularly useful for gripping thin-wall tubes, comprising: a first gripping member formed at one end with two spaced loops adapted to partially enclose one side of the object; a second gripping member formed at one end with a third loop interposed between the two loops of the first gripping member and adapted to partially enclose the opposite side of the object; and actuator means engaging the opposite ends of the two gripping members and adapted to move them away from each other to cause their loops to grip the object, or towards each other to cause their loops to release the object.

As will be apparent from the description below, such a gripper device provides a number of important advantages over previously known devices. An important advantage is that the novel gripper device distributes the gripping force substantially uniformly about an extended outer surface of the object being gripped and therefore, by avoiding points of concentrated force, it is able to grip the object with little danger of deformation or damage. This is particularly important when gripping thin-wall or ultra-thin-wall tubes having a high ratio of radius to wall thickness (R/T) in the order of 300 or more.

Further, since the gripping device operates by mechanical gripping, rather than by vacuum, magnetic or electro-magnetic gripping, it obviates the need for a vacuum, magnetic or electro-magnetic control system, and therefore can be constructed at relatively low cost. Morever, the novel gripper does not require that the object being gripped be metallic, as would normally be required in a magnetic or electro-magnetic system. The invention, therefore, provides a greater range of application with lower cost than the above prior known systems.

In addition, the novel gripping device may be incorporated in an industrial robot, as will be described more particularly below, to access the object being gripped from above, and to have a constant center with which the object would be aligned at the end of the gripping action. These features make the novel gripping device particularly useful for inclusion in a robotic parts-assembly system.

According to a futher feature of the invention, the gripping device further includes a sleeve for each of the two gripping members, each sleeve being disposed at the opposite end of the respective gripping member, which sleeves are movable along their respective members for varying the effective gripping size of the loops defined by them. Such an arrangement thus enables the gripping device to be conveniently adjustable in a continuous manner so as to be useful with a relatively wide range of object dimensions.

According to a still further feature of the present invention, the gripping members may be made of flexible photo-elastic material so as to provide an optical indication of the force applied to them during use. The gripping device of the invention thus not only permits the gripping force to be controlled, but also permits this gripping force to be conveniently indicated so that the system can be preset or controlled to insure a sufficient but not excessive gripping force is applied.

Further features and advantages of the invention will be apparent from the description below.

BRIEF DESCRIPTION OF THE DRAWINGS

The invention as herein described, by way of example only, with reference to the accompanying drawings, wherein.

DETAILED DESCRIPTION OF THE TWO ILLUSTRATED PREFERRED EMBODIMENTS

Figure 1:
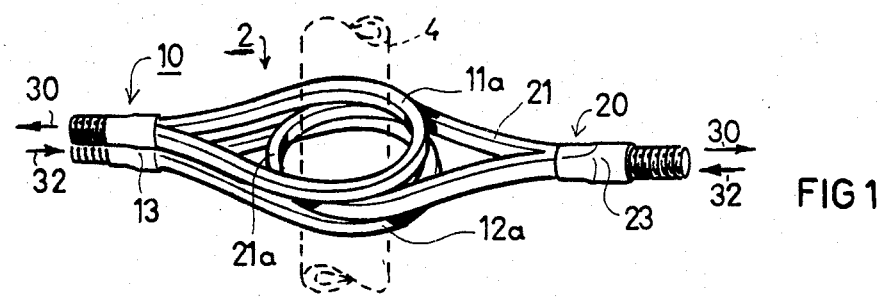
FIG. 1 is a three-dimensional view illustrating the main elements of one form of gripping device constructed in accordance with the present invention.
Figure 2:
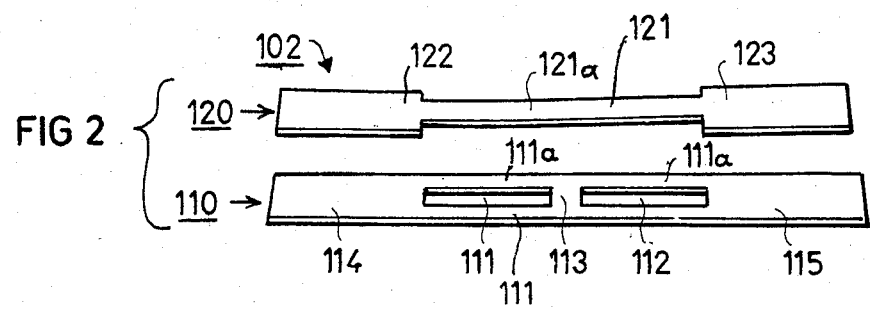
FIG. 2 illustrates the main elements of a modified, improved form of gripping device constructed in accordance with the present invention.

The invention is described herein, for purposes of example only, with respect to two preferred embodiments as illustrated in FIGS. 1 and 2.

Thus, with reference first to FIG. 1, the gripping device, therein generally designated 2, comprises two gripping members, generally designated 10 and 20, respectively. Gripping member 10 is constituted of two flexible strips 11, 12, each formed at its mid-portion with a loop 11a, 12a, respectively. The four ends of the two strips 11 and 12, opposite to their loops 11a, 12a, are secured together as shown at 13.

The second gripping member 20 is formed of a single flexible strip 21 also looped at its mid-portion 21a, the two ends of strip 21 being secured together as shown at 23. Strip 21, including its loop 21a, is interposed between the two loops 11a, 12a, of the two flexible strips 11 and 12.

FIG. 1 illustrates the use of the above-described gripping device 2 for gripping and releasing a thin-wall tube shown in broken lines at 4. Thus, it will be seen that the two loops 11a, 12a of gripping member 10 are adapted to partially enclose one side (the right side) of tube 4; whereas loop 21a of gripping member 20 is adapted to enclose the opposite side (the left side) of tube 4. It will also be seen that the two ends 13, 23 of the gripping members 10 and 20, respectively, may be moved away from each other (as shown by arrows 30) in order to decrease the effective gripping diameter formed by these loops and thereby to grip the tube 4 between them; or the tow ends 13, 23 may be moved towards each other (as shown by arrows 32) in order to increase this effective gripping diameter and thereby to release the tube. Further, it will be seen that when the ends 13, 23 of the two members 10, 20 are moved away from each other, the gripping action effected with respect to tube 4 is very firm because of the interposition of loop 21a between the two loops 11a and 12a, and is distributed substantially uniformly for a major portion of the circumference of the tube.

The embodiment illustrated in FIG. 2 is a modified, improved arrangement which provides a number of further advantages. Thus, the gripping device illustrated in FIG. 2, therein generally designated 102, is also constituted of two gripping members, designated 110 and 120, respectively. Member 110 corresponds to, and serves the function of, gripping member 10 in FIG. 1; and member 120 corresponds to, and serves the function of, gripping member 20 in FIG. 1.

Gripping member 110, however, is in the form of a single, continuous, flexible strip (rather than two strips as illustrated in FIG. 1) and is provided with a pair of rectangular slots 111 and 112 separated by a central web 113. The opposite ends of strip 110 are unslotted, as shown at 114 and 115, respectively.

Gripping member 120 is also of a single flexible strip. It is formed with an intermediate portion 121 of a reduced width substantially equal to the width of the two slots 111, 112 of strip 110, so that this portion 121 of strip 120 may be passed through the slots 111, 112 of strip 110. The opposite ends of strip 120 are not reduced, but rather are of substantially the same width as the ends 114, 115 of strip 110.

Figure 3:
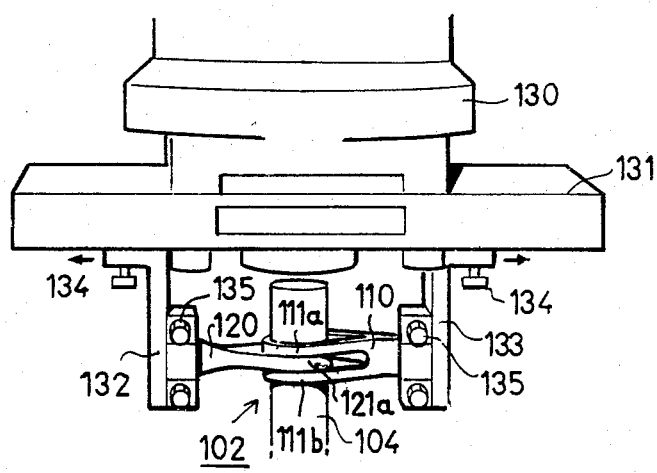
FIG. 3 illustrates a robotic arm equipped with the gripping device of FIG. 2.

In use, strip 120 is passed through slots 111 and 112 of strip 110, as shown in FIG. 3, so as to form concentric loops at their midportions engaging the opposite sides of the tube 104, with the free ends of the two strips facing in opposite directions and secured to means which may move them away from or towards each other. Thus, when the opposite ends are moved away from each other, a similar gripping action is provided as described above with respect to FIG. 1. Thus, the upper margins 111a serve the function of the upper loop 11a in FIG. 1, and the lower margins 112a serve the function of the lower loop 12a in FIG. 1; and the central portion 121a of the reduced-width section 121 of strip 120 serves the function of loop 21a in FIG. 1.

However, an important advantage in the arrangement illustrated in FIGS. 2 and 3 is that the central web 113 of strip 110 also engages the outer surface of the tube 104 being gripped; and, perhaps more important, this interconnecting web 113 prevents the two loops 111a, 112a defined by the flexible strip 110 from separating. This arrangement of FIG. 2 thus better assures a uniform and continuous application of the force applied by the gripping device to the tube 104 being gripped.

FIG. 3 illustrates the gripping device 102 of FIG. 2 mounted at the end of a robotic arm 130 for use in gripping and releasing the tube 104 or other object gripped by the device. Thus, the robotic arm 130 extends in the vertical direction and terminates at its lower end in a horizontally-extending mounting plate 131. To the underside of the horizontal plate 131 are mounted a pair of vertically-depending actuator plates 132, 133, respectively, these plates being mounted to any suitable actuating mechanism, e.g., by screws 134, so as to be movable towards and away from each other. The outer end of each of the gripping members 110, 120 is fixed, as by a fastener 135, to the inner face of its respective actuator plate 132.

It will thus be seen that whenever the two actuator plates 132, 133 are moved towards each other, the effective diameter of the loops defined by the two gripping members 110, 120 will increase in diameter, thereby enabling the gripping device to access the tube 104 (or other object) from above, whereupon the actuator plates 132, 133 may be moved away from each other so as to firmly grip the tube between these loops, as described above. When the tube 104 is to be released, the actuator plate 132, 133 are moved towards each other, thereby again increasing the effective diameter of the loops to release the tube 104.

Figure 4:
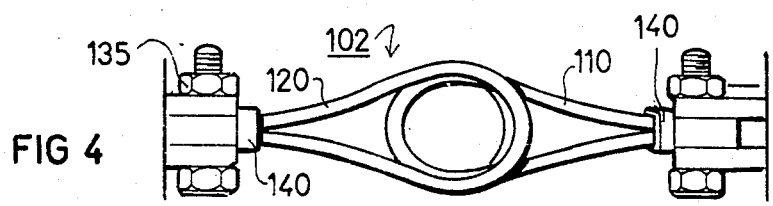
FIGS. 4 and 5 are end views illustrating the main elements of the gripping device of FIGS. 2 and 3, and particularly illustrating the convenient manner in which the effective gripping size of the device may be continuously varied by the use of a pair of sleeves movable along the length of the device.
Figure 5:
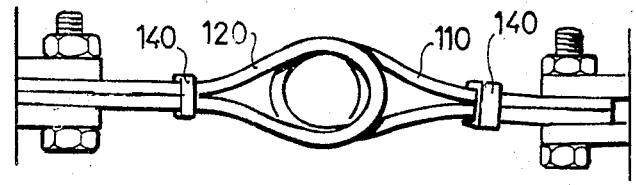

The gripping device 102 further includes a pair of sleeves 140, 142, one for each of the two gripping members 110, 120. These sleeves may be used for fixing the effective gripping size of the loops formed by the two members. Thus, the two sleeves 140 may be moved towards their outer ends fixed to the two actuator plates 132, 133, in order to increase the effective gripping size of their loops, as shown in FIG. 4, or may be moved towards each other in order to decrease the effective gripping size of the two loops, as shown in FIG. 5. It will thus be seen that, by the mere provision of the two movable sleeves 140, 142, the gripping device may be adjusted in a continuous manner for a wide range of gripping sizes.

Preferably, the gripping members 110, 120 (and also 10, 20 in FIG. 1) are made of resilient elastomeric material, such as natural or synthetic rubber. The use of such material further assures a firm gripping action with little danger of deforming or damaging the gripped object even when the gripping device is used with ultra-thin-wall tubes or other highly delicate objects. The sleeves 140 may also be made of elastomeric material, which would thereby better assure that the sleeves remain in their preset positions.

As a further variation, the two gripping members 110, 120 (as well as members 10, 20 in FIG. 1) may be made of a photo-elastic material to provide an optical indication of the force applied by these members during use, as well known with respect to such photo-elastic materials. In using a photo-elastic material for these members, the gripping device, and particularly its actuators 132, 133, can be conveniently preset to assure that a sufficient but not excessive gripping force is applied to the object. This would obviate the need for other force sensors commonly used for this purpose.

The gripping device illustrated in FIG. 3 was installed and operated on a Unimation PUMA 600 Robot, and proved itself reliable in assembling an ultra-thin-wall tube onto a cylinder with slide tolerance between the latter two. It was found operable with respect to a tube of 0.01 mm wall thickness and radius of 6 mm (R/T=600), and moreover, it was able to meet the PUMA's 0.1 mm repeatability limit. By using photoelastic material for the gripper elements, as described above, the force applied was easily measured by using an 030 series reflection polariscope and compensator for counting the number of fringes that appear through a given point. The described arrangement was also used for assembling the ultra-thin-wall tube onto a cylinder by using a passive alignment of centers, like an RCC (Remote Center Compliance).

While the invention has been described with respect to two preferred embodiments, it will be appreciated that many other variations, modifications and applications of the invention may be made.

What is claimed is:

1. An object-gripping device particularly useful for gripping thin-wall tubes, comprising:
   a first gripping member formed at one end with two spaced loops adapted to partially enclose one side of the object;
   a second gripping member formed at one end with a third loop interposed between the two loops of the first gripping member and adapted to partially enclose the opposite side of the object; and
   actuator means engaging the opposite ends of the two gripping members and adapted to move them away from each other to cause their loops to grip the object, or towards each other to cause their loops to release the object.

2. The device according to claim 1, wherein said first gripping member comprises two flexible strips each formed as a loop at an intermediate portion, the four ends of the two strips being secured together;
   said second gripping member comprising a third flexible strip formed as a loop at an intermediate portion which loop is interposed between the two loops of said first gripping member, the two ends of the third strip being secured together.

3. The device according to claim 1, wherein said first gripping member comprises a first flexible strip formed with a pair of slots separated by a central web;
   and wherein said second gripping member comprises a second flexible strip looped through said pair of slots such that said first strip defines said two spaced loops joined together by said central web and partially enclosing one side of the object, and said second strip defines said third loop interposed between said two spaced loops and partially enclosing the other side of the object.

4. The device according to claim 3, wherein said second flexible strip comprises an intermediate portion having a width substantially equal to that of the slots of said first strip, and end portions having a width substantially larger than that of said intermediate portion.

5. The device according to claim 4, wherein said first flexible strip has a substantially uniform width, and wherein the width of said end portions of the second flexible strip is substantially equal to that of the first flexible strip.

6. The device according to claim 3, wherein the length of said central web separating said pair of slots in the first flexible strip is at least equal to the width of said slots.

7. The device according to claim 1, wherein said two gripping members are of looped flexible material and further include a sleeve for each member which sleeves enclose the movable ends of the gripping members for fixing the effective gripping size of the loops formed by them.

8. The device according to claim 7, wherein said sleeves are movable along their respective gripping members for varying said effective gripping size of the loops formed by the two members.

9. The device according to claim 7, wherein said sleeves are made of resilient elastomeric material.

10. The device according to claim 1, wherein said gripping members are made of resilient elastomeric material.

11. The device according to claim 1, wherein said gripping members are made of a photoelastic material so as to provide an optical indication of the force applied thereto during use.

12. An industrial robot having a vertical arm carrying at its end an object-gripping device according to claim 1, the actuator means engaging the opposite ends of the two gripping members being movable in the horizontal plane away from each other to cause their loops to grip the object from above, or towards each other to cause their loops to release the object.

13. The industrial robot according to claim 12, wherein each of said gripping members includes a sleeve movable along the length thereof for varying the effective gripping size of the loops formed by the two members.

14. The industrial robot according to claim 12, wherein said gripping members are made of photoelastic material so as to provide an optical indication of the force applied thereto during use.

* * * * *